US011978891B2

United States Patent
Choi et al.

(10) Patent No.: US 11,978,891 B2
(45) Date of Patent: May 7, 2024

(54) POSITIVE ELECTRODE ACTIVE MATERIAL AND LITHIUM SECONDARY BATTERY INCLUDING THE SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Hyun Jong Yu, Cheongju-si (KR); Seung Hyun Choi, Cheongju-si (KR); Yu Gyeong Chun, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 225 days.

(21) Appl. No.: 16/905,866

(22) Filed: Jun. 18, 2020

(65) Prior Publication Data

US 2021/0057731 A1    Feb. 25, 2021

(30) Foreign Application Priority Data

Aug. 19, 2019   (KR) .................. 10-2019-0100998

(51) Int. Cl.
  *H01M 4/525*   (2010.01)
  *H01M 4/131*   (2010.01)
  *H01M 4/36*    (2006.01)
  *H01M 4/485*   (2010.01)
  *H01M 4/505*   (2010.01)
  *H01M 10/0525* (2010.01)
  *H01M 4/02*    (2006.01)

(52) U.S. Cl.
  CPC .......... *H01M 4/366* (2013.01); *H01M 4/485* (2013.01); *H01M 10/0525* (2013.01); *H01M 2004/028* (2013.01)

(58) Field of Classification Search
  None
  See application file for complete search history.

(56) References Cited

U.S. PATENT DOCUMENTS

2014/0158932 A1\* 6/2014 Sun ................. H01M 4/505
                                          252/182.1
2021/0043917 A1\* 2/2021 Kurita ............ H01M 10/0525

FOREIGN PATENT DOCUMENTS

| CN | 104521039 A    | 4/2015  |
| CN | 110050368 A    | 7/2019  |
| JP | 2018-98183 A   | 6/2018  |
| KR | 10-2013-0138073 A | 12/2013 |
| KR | 20150069334 A  | 6/2015  |
| KR | 101577179 B1   | 12/2015 |

(Continued)

OTHER PUBLICATIONS

The European Search Report dated Jan. 18, 2021 by the European Patent Office, which corresponds to European Patent Application No. 20 18 6693.

(Continued)

*Primary Examiner* — Zhongqing Wei
(74) *Attorney, Agent, or Firm* — Studebaker & Brackett PC

(57) ABSTRACT

The present invention relates to a positive electrode active material, in which primary particles included in a secondary particle exhibit an aspect ratio gradient which gradually increases from the center of the secondary particle to the surface thereof, and a lithium secondary battery which uses a positive electrode containing the positive electrode active material.

8 Claims, 12 Drawing Sheets

(56) References Cited

FOREIGN PATENT DOCUMENTS

| KR | 10-2019-0008156 A | 1/2019 |
|---|---|---|
| KR | 10-2019-0086403 A | 7/2019 |
| WO | 2018-160023 A1 | 9/2018 |

OTHER PUBLICATIONS

Hoon-Hee Ryu et al.; "Suppressing detrimental phase transitions via tungsten doping of LiNiO2 cathode for next-generation lithium-ion batteries"; Journal of Materials Chemistry A; Jan. 1, 2019; pp. 18580-18588; vol. 7; No. 31. XP055765569.

U.-H. Kim et al.; "Pushing the limit of layered transition metal oxide cathodes for high-energy density rechargeable Li ion batteries"; Energy & Environmental Science; Jan. 1, 2018; pp. 1271-1279; vol. 11; No. 5; XP055765572; Cambridge.

S.-W.Woo et at.; "Improvement of electrochemical and thermal properties of Li [Ni0.8Co0.1Mn0.1]O2 positive electrode materials by multiple metal (Al,Mg) substitution"; Electrochimica Acta; Jun. 1, 2009; pp. 3851-3856; vol. 54; No. 15; XP026040267; Elsevier; Amsterdam, NL.

\* cited by examiner

POSITIVE ELECTRODE ACTIVE MATERIAL AND LITHIUM SECONDARY BATTERY INCLUDING THE SAME

CROSS-REFERENCE TO RELATED APPLICATION

This application claims priority to and the benefit of Korean Patent Application No. 10-2019-0100998, filed on Aug. 19, 2019, the disclosure of which is incorporated herein by reference in its entirety.

BACKGROUND

1. Field of the Invention

The present invention relates to a positive electrode active material in which primary particles included in secondary particles exhibit an aspect ratio gradient which gradually increases from the center of the secondary particle to the surface thereof, and a lithium secondary battery using a positive electrode containing the positive electrode active material.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of the achievement of safety, lithium secondary batteries using LFP have been mainly used. However, recently, the use of a nickel-based lithium composite oxide, which has a larger energy capacity per weight than LFP, is expanding.

In accordance with such trend of positive electrode materials, the present invention is directed to providing a positive electrode active material, which has a high energy density and is improved in lifetime and stability.

In addition, the present invention is also directed to providing a positive electrode slurry composition, which includes the positive electrode active material defined herein.

Moreover, the present invention is also directed to providing a lithium secondary battery, which includes a positive electrode formed by coating a current collector with the positive electrode slurry composition defined herein.

The objects of the present invention are not limited to the above-mentioned objects (e.g., for electric cars), and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

One aspect of the present invention provides a positive electrode active material, which includes primary particles enabling lithium intercalation and deintercalation and secondary particles formed by agglomerating the primary particles.

Here, the primary particles included in the secondary particles exhibit an aspect ratio gradient which increases from the center of the secondary particle to the surface thereof.

Here, the primary particles and the secondary particles, which are included in the positive electrode active material, may satisfy at least the following Formula 1, thereby improving particle density in the positive electrode active material.

Accordingly, the electrochemical properties of the positive electrode active material may be improved.

$$X_1 \geq 1.15 (X_1 = L_1/L_2) \qquad \text{[Formula 1]}$$

(Here, when the distance from the center of the secondary particle to the surface thereof is R, $L_1$ is an average aspect ratio of the primary particles present in a first region in which the distance from the center of the secondary particle is ⅔R to R, and $L_2$ is an average aspect ratio of the primary particles present in a second region in which the distance from the center of the secondary particle is ⅓R to ⅔R.)

In addition, the primary particles and the secondary particles, which are included in the positive electrode active material, may satisfy at least the following Formula 2, thereby further improving particle density in the positive electrode active material. In addition, during charging/discharging of a lithium secondary battery manufactured using the positive electrode active material, a partial strain caused by asymmetric volume expansion can be effectively reduced.

$$X_2 \geq 1.35 (X_2 = L_2/L_3)$$ [Formula 2]

(Here, $L_3$ is an average aspect ratio of the primary particles present in a third region in which the distance from the center of the secondary particle is 0 to ⅓R.)

In addition, the primary particles in the secondary particles have a rod shape radiated from the center of the secondary particle to the surface thereof, and since the primary particles have an aspect ratio gradient which increases from the center of the secondary particle to the surface thereof, the rod-shaped primary particle may be developed toward the surface of the secondary particle.

The primary particle has a rod shape which has the major axis (a-axis) length different from the minor axis (c-axis) length, and a lithium ion diffusion pathway is present in a direction parallel to the direction of the major axis (a-axis) in the primary particle. Therefore, the electrochemical properties of the positive electrode active material may be further improved.

Another aspect of the present invention provides a positive electrode slurry composition, which includes the positive electrode active material defined herein, a conductive material and a binder.

Still another aspect of the present invention provides a lithium secondary battery, which includes a positive electrode formed by coating a current collector with the positive electrode slurry composition defined herein.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
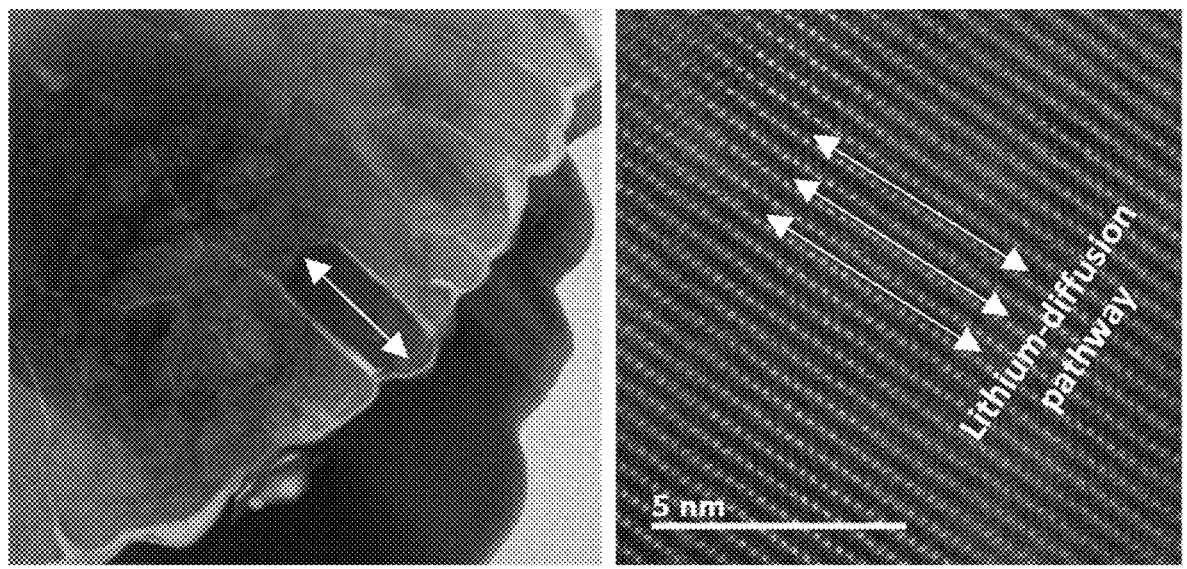
FIG. 1 shows the direction of the major axis (a-axis) of a primary particle included in a partial region of a positive electrode active material (secondary particle) according to an embodiment of the present invention and a lithium ion diffusion pathway formed in the primary particle.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material and a lithium secondary battery using a positive electrode containing the positive electrode active material according to the present invention will be described in further detail.

Positive Electrode Active Material

According to one aspect of the present invention, a positive electrode active material, which includes primary particles enabling lithium intercalation and deintercalation and secondary particles formed by agglomerating the primary particles, is provided.

Here, the primary particle refers to one grain or crystallite, and the secondary particle refers to an agglomerate formed by agglomerating a plurality of primary particles. There may be a pore and/or a grain boundary between the primary particles constituting the secondary particle.

In addition, the shape of the primary particle is not particularly limited, but preferably, the primary particle may have a rod shape close to relatively spherical in a region adjacent to the center of the secondary particle. However, due to an aspect ratio gradient increasing from the center of the secondary particle to the surface thereof, the primary particle may have a rod shape developed toward the surface of the secondary particle.

Here, as the average major axis length of the primary particles is in the range of 0.01 to 5 μm, and preferably, 0.01 to 2 μm, the optimal density of a positive electrode prepared using a positive electrode active material according to any of various embodiments of the present invention may be achieved. In addition, the average particle diameter of the secondary particles may vary according to the number of the agglomerated primary particles, and may be 0.1 to 25 μm.

In one embodiment, the primary particles included in the secondary particle exhibit an aspect ratio gradient increasing from the center of the secondary particle to the surface thereof.

The term "aspect ratio" used herein is a ratio (length/width ratio) of the major axis (length; a-axis) and the minor axis (width; c-axis) of the primary particle, and when the major axis indicates a direction of a relatively longer region of the primary particle, the minor axis indicates a length of a relatively shorter region of the primary particle. Here, the minor axis may be a direction perpendicular to the major axis.

Therefore, the primary particle may have a rod shape having different major axis (a-axis) and minor axis (c-axis) lengths.

Hereinafter, for convenience, the major axis is to be defined as an a-axis, and the minor axis is to be defined as a c-axis.

In one embodiment, there may be a lithium ion diffusion pathway in the primary particle, and the lithium ion diffusion pathway may be parallel to the a-axis direction of the primary particle.

In the case of a conventional positive electrode active material (secondary particle), the a-axis of the primary particles forming the positive electrode active material (secondary particle) is randomly oriented, so that the lithium ion diffusion pathways present along the a-axis direction of the primary particle must also be present randomly. Therefore, it is difficult to effectively form the lithium ion diffusion pathways along the direction from the center of the secondary particle to the surface thereof.

In addition, in the case of the conventional positive electrode active material, since there is no aspect ratio gradient gradually increased from the center of the secondary particle to the surface thereof, the density of the primary particles in the secondary particle must be relatively low, and it is very likely that cracks in the positive electrode active material are generated due to random volume expansion of the primary particle during charging/discharging.

Meanwhile, according to one embodiment of the present invention, the primary particles have an aspect ratio gradient increasing from the center of the secondary particle to the surface thereof, and here, the aspect ratio gradient satisfies a specific numerical range which will be described below. In addition, as the primary particles having the above-described aspect ratio gradient pattern are present radially from the center of the secondary particle, it is possible to effectively relieve strain caused by the volume expansion of the primary particle during charging/discharging. Therefore, it is possible to improve the lifetime and stability of a lithium secondary battery using the positive electrode active material.

In addition, the primary particles forming a positive electrode active material (secondary particle) according to an embodiment of the present invention are arranged such that the a-axis direction is oriented toward the center of the secondary particle. In addition, the primary particle has a rod shape radiated from the center of the secondary particle to the surface thereof. Due to this agglomerated shape, a lithium ion diffusion pathway may be formed along a direction from the center of the secondary particle to the surface thereof, and it is also possible to increase energy density by improving the density of the primary particles agglomerated in the secondary particle.

Figure 2:
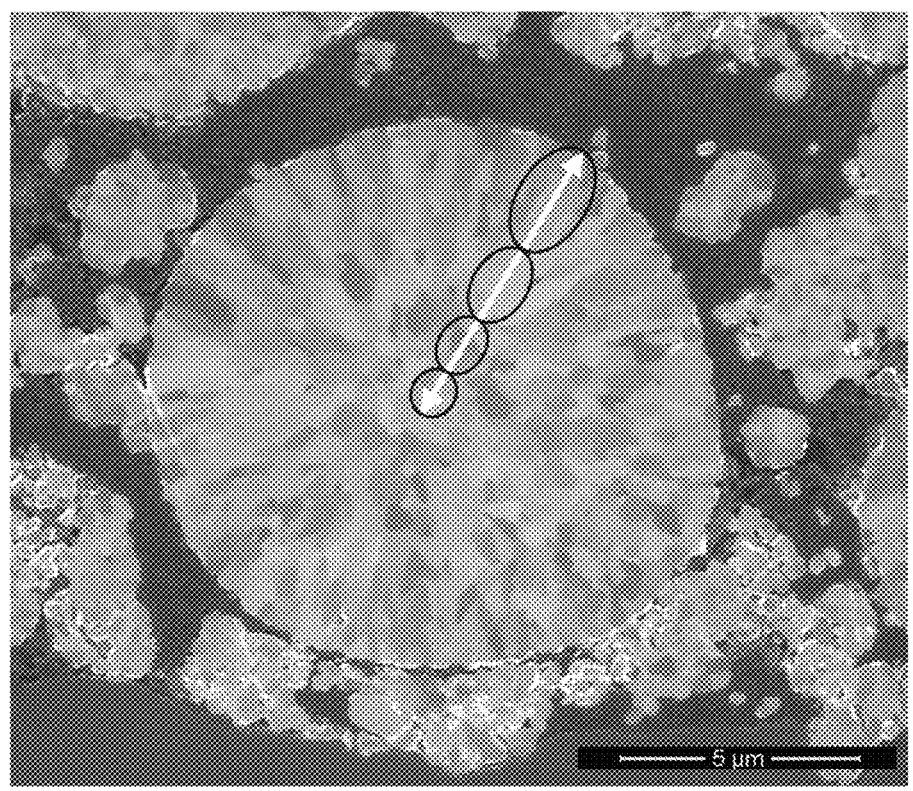
FIGS. 2 and 3 show an aspect ratio gradient and a lithium ion diffusion pathway of primary particles included in a positive electrode active material (secondary particle) according to an embodiment of the present invention, respectively.
Figure 3:
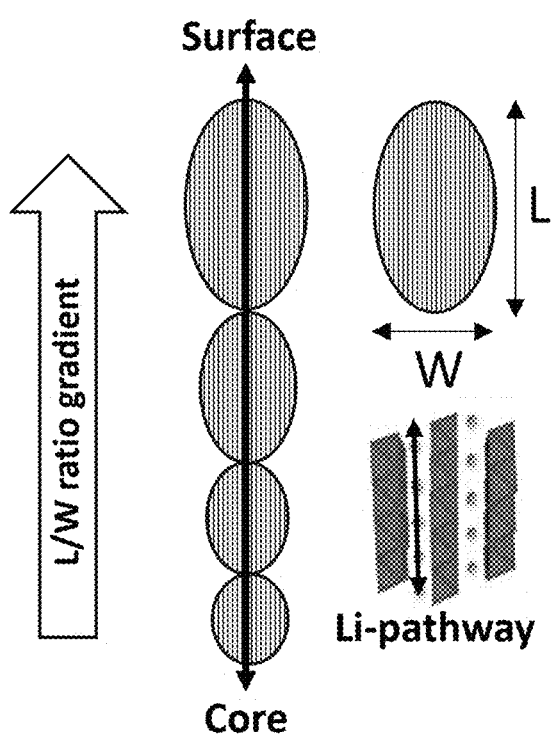

FIG. 1 shows the direction of the major axis (a-axis) of a primary particle included in a partial region of a positive electrode active material (secondary particle) according to an embodiment of the present invention and a lithium ion diffusion pathway formed in the primary particle. FIGS. 2 and 3 show an aspect ratio gradient and a lithium ion diffusion pathway of primary particles included in a positive electrode active material (secondary particle) according to an embodiment of the present invention, respectively.

Referring to FIGS. 1 to 3, the lithium ion diffusion pathway present in the primary particles exhibiting the aspect ratio gradient increasing from the center of the secondary particle to the surface thereof may be parallel to the a-axis direction of the primary particle.

Here, the lithium ion diffusion pathway parallel to the a-axis direction of the primary particle should be understood as including the cases in which the lithium ion diffusion pathway is not only present in a direction exactly corresponding to the a-axis direction of the primary particle, but an angle made with the a-axis direction of the primary particle is approximately ±40°, and preferably, approximately ±30°.

That is, the lithium ion diffusion pathway may be present to have an angle of approximately ±40° with respect to the a-axis direction of the primary particle, and here, the lithium ion diffusion pathway may also have an angle of approximately ±40° with respect to the direction connecting from the center of the secondary particle to the surface thereof.

In this embodiment, the primary particles may have an aspect ratio gradient continuously increasing from the center of the secondary particle to the surface thereof, but the present invention is not necessarily limited thereto.

That is, the aspect ratios of the primary particles increase from the center of the secondary particle to the surface thereof, and the aspect ratio gradient of the primary particles may continuously or discontinuously increase depending on the manner of defining a gradient. In this case, the primary particles and the secondary particles preferably have an aspect ratio gradient satisfying Formulas 1 to 4 to be described below.

Here, the primary particles and the secondary particles, which are included in the positive electrode active material, may at least satisfy Formula 1 below, thereby improving a particle density in the positive electrode active material. Therefore, the electrochemical properties of the positive electrode active material may be improved.

$$X_1 \geq 1.15 (X_1 = L_1/L_2) \quad \text{[Formula 1]}$$

(Here, when the distance from the center of the secondary particle to the surface thereof is R, $L_1$ is an average aspect ratio of the primary particles present in a first region, in which the distance from the center of the secondary particle is ⅔R to R, and $L_2$ is an average aspect ratio of the primary particles present in a second region, in which the distance from the center of the secondary particle is ⅓R to ⅔R.)

When $X_1$ in Formula 1 is less than 1.15, the density of the primary particles present in the first region may be reduced, and thus the surface area of the secondary particle may increase. When the surface area of the secondary particle increases, the possibility of a side reaction with an electrolyte in the lithium secondary battery increases, and thus the lifetime and/or stability of the lithium secondary battery may be reduced.

Meanwhile, when $X_1$ in Formula 1 is more than 1.75, as the difference between the aspect ratios of the primary particles present in the first region and the second region becomes relatively large, asymmetric volume expansion may arise during charging/discharging.

In addition, as the primary particles and the secondary particles, which are included in the positive electrode active material, satisfy at least Formula 2 below, a particle density in the positive electrode active material may be further improved, and in addition, during charging/discharging of a lithium secondary battery manufactured using the positive electrode active material, a partial strain caused by asymmetric volume expansion can be effectively reduced.

$$X_2 \geq 1.35 (X_2 = L_2/L_3) \quad \text{[Formula 2]}$$

(Here, $L_3$ is an average aspect ratio of the primary particles present in a third region in which the distance from the center of the secondary particle is 0 to ⅓R.)

When $X_2$ in Formula 2 is less than 1.35, the primary particles present in the second region surrounding the third region are difficult to have a sufficiently radial orientation with respect to the third region, and it may be difficult to sufficiently improve the density of the primary particles in the second region located between the first region and the second region.

Meanwhile, when $X_2$ in Formula 2 is more than 1.95, the difference in the aspect ratios of the primary particles present in the second region and the third region is relatively large, and the difference in the aspect ratios of the primary particles present in the first region and the second region is relatively small. Consequently, as the difference in the aspect ratios of the primary particles present at the center of the secondary particles and the surface thereof is excessively large, the possibility of cracks caused by the volume expansion of the primary particles may be increased during charging/discharging.

In addition, the primary particles and the secondary particles, which are included in the positive electrode active material, may satisfy Formula 3 below representing a ratio of the resultant values of Formula 1 and Formula 2. Accordingly, the primary particles may exhibit an aspect ratio gradient gradually increasing from the center of the secondary particle to the surface thereof, and may have a rod shape gradually developed from the center of the secondary particle to the surface thereof.

$$X_2/X_1 \geq 0.70 \qquad \text{[Formula 3]}$$

In addition, the primary particles and the secondary particles, which are included in the positive electrode active material, may satisfy at least Formula 4 below. The following Formula 4 represents the minimal size of the aspect ratio gradient of the primary particles present in the secondary particles, and the primary particles and the secondary particles satisfy the following Formula 4, and thus a high energy density in the positive electrode active material may be expected.

$$X_3 \geq 1.70 (X_3 = L_1/L_3) \qquad \text{[Formula 4]}$$

The primary particles satisfying Formulas 1 to 4, as described above, may be defined as a lithium composite oxide represented by Chemical Formula 1 below.

$$Li_w Ni_{1-(x+y+z)} Co_x M1_y M2_z O_2 \qquad \text{[Chemical Formula 1]}$$

(Here,

M1 is at least one selected from Mn and Al,

M2 is at least one selected from Mn, B, Ba, Ce, Hf, Ta, Cr, F, Mg, Al, Cr, V, Ti, Fe, Zr, Zn, Si, Y, Nb, Ga, Sn, Mo, W, P, Sr, Ge, Nd, Gd and Cu, M1 and M2 are elements different from each other, $0.5 \leq w \leq 1.5$, $0.01 \leq x \leq 0.50$, $0.01 \leq y \leq 0.20$, and $0.001 \leq z \leq 0.20$.)

In addition, M2 present at the surface of the secondary particle may exhibit a concentration gradient decreasing toward the center of the secondary particle. That is, the direction of the concentration gradient of M2 may be a direction from the surface of the secondary particle to the center of the secondary particle.

In addition, in another embodiment, a positive electrode active material may include a coating layer covering at least a part of the first particle (e.g., the interface between the primary particles) and/or the surface of a secondary particle formed by agglomerating the primary particles.

For example, the coating layer may be present to cover at least a part of an exposed surface of the primary particle. Particularly, the coating layer may be present to cover at least a part of the exposed surface of the primary particle present at the outermost surface of the secondary particle.

Therefore, the coating layer may be present as a layer that continuously or discontinuously coats the surface of the primary particle and/or the surface of the secondary particle formed by agglomerating the primary particles. When the coating layer is present discontinuously, it may be present in an island shape.

The coating layer present as described above may contribute to an improvement in physical and electrochemical properties of a positive electrode active material.

In addition, the coating layer may be present in the form of a solid solution that does not form a boundary between the primary particles and/or the secondary particles formed by agglomerating the primary particles.

The coating layer may include at least one oxide represented by the following Formula 2. That is, the coating layer may be defined as a region in which there is the oxide represented by the following Chemical Formula 2.

$$Li_a M3_b O_c \qquad \text{[Chemical Formula 2]}$$

(Here,

M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, and $2 \leq c \leq 13$.)

In addition, the coating layer may be in the form in which heterogeneous oxides are simultaneously present in one layer, or heterogeneous oxides represented by Formula 2 are respectively present in different layers.

The oxide represented by Chemical Formula 2 may be physically and/or chemically bound with the primary particle represented by Chemical Formula 1. In addition, the oxide may be present in a solid solution formed with the primary particle represented by Chemical Formula 1.

The positive electrode active material according to the embodiment may include a coating layer covering at least a part of the surface of the primary particle (e.g., the interface between the primary particles) and/or the surface of the secondary particle formed by agglomerating the primary particles, thereby increasing structural stability. In addition, when the positive electrode active material is used in a lithium secondary battery, the high-temperature storage stability and lifetime of the positive electrode active material may be improved. In addition, the oxide may reduce residual lithium in the positive electrode active material and also serve as a migration pathway of lithium ions, and therefore, it can have a positive influence on the efficiency of a lithium secondary battery.

In addition, in some cases, the oxide may be present in at least a part of the interface between the primary particles and the surface of the secondary particle, and even in an inner pore formed in the secondary particle.

The oxide may be an oxide prepared as a composite of lithium and an element represented by A, or as an oxide of A, the oxide may be, for example, $Li_a W_b O_c$, $Li_a Zr_b O_c$, $Li_a Ti_b O_c$, $Li_a Ni_b O_c$, $Li_a B_b O_c$, $Li_a Co_b O_c$, $Li_a Al_b O_c$, $Co_b O_c$, $Al_b O_c$, $W_b O_c$, $Zr_b O_c$, $Ti_b O_c$ or $B_b O_c$. However, the above-mentioned examples are merely provided for convenience to help in understanding of the present invention, and the oxide defined herein is not limited to the above-mentioned examples.

In another embodiment, the oxide may be or may further include an oxide prepared as a composite of lithium and at least two types of elements represented by A. The oxide prepared as a composite of lithium and at least two types of elements represented by A may be, for example, $Li_a(W/Ti)_b O_c$, $Li_a(W/Zr)_b O_c$, $Li_a(W/Ti/Zr)_b O_c$, or $Li_a(W/Ti/B)_b O_c$, but the present invention is not necessarily limited thereto.

Here, the oxide may exhibit a concentration gradient decreasing from the surface of the secondary particle to the center thereof. Therefore, the concentration of the oxide may decrease from the outermost surface of the secondary particle to the center thereof.

As described above, as the oxide exhibits a concentration gradient decreasing from the surface of the secondary particle to the center thereof, residual lithium present at the surface of the positive electrode active material may be effectively reduced, thereby preventing a side reaction caused by unreacted residual lithium in advance. In addition, a decrease in crystallinity in an inner region from the surface of the positive electrode active material by the oxide may be prevented. In addition, it is possible to prevent the entire structure of the positive electrode active material from collapsing due to the oxide during an electrochemical reaction.

Additionally, the coating layer includes a first oxide layer containing at least one oxide represented by Chemical Formula 2 and at least one oxide represented by Chemical Formula 2, and may include a second oxide layer including an oxide different from the oxide contained in the first oxide layer.

For example, the first oxide layer may be present to cover at least a part of an exposed surface of the primary particle present at the outermost surface of the secondary particle, and the second oxide layer may be present to cover at least a part of the exposed surface of the primary particle which is not covered by the first oxide layer and the surface of the first oxide layer.

Lithium Secondary Battery

Another aspect of the present invention may provide a positive electrode including a positive electrode current collector and a positive electrode active material layer formed on the positive electrode current collector. Here, the positive electrode active material layer may include any one of the positive electrode active materials according to various exemplary embodiments of the present invention. Therefore, since the positive electrode active material is the same as described above, for convenience, detailed description will be omitted, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the positive electrode current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder selectively included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer maybe prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

In addition, in another exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support, and then laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a migration path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiCl_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Experimental Example 1

(1) Preparation of Positive Electrode Active Material

Example 1

A spherical $Ni_{0.92}Co_{0.08}(OH)_2$ hydroxide precursor was synthesized by a co-precipitation method. In a 90 L reactor, a 1.5 M metal aqueous solution prepared by mixing $NiSO_4 \cdot 7H_2O$ and $CoSO_4 \cdot 7H_2O$ in a molar ratio of 92:8 and a 30 wt % ammonia solution were continuously input thereinto for 20 to 40 hours at 3.0 kg/hr and 0.2 kg/hr, respectively. In addition, to maintain the pH in the reactor at 11.5, a 20 wt % sodium hydroxide aqueous solution was supplied at 2 kg/hr. Here, the temperature of the reactor was maintained at 60° C., and an inert gas, $N_2$, was added to the reactor to prevent the prepared precursor from being oxidized. After the completion of synthesis and stirring, washing and dehydration were performed using filter press (F/P) equipment, thereby obtaining a $Ni_{0.92}Co_{0.08}(OH)_2$ hydroxide precursor.

Figure 4:
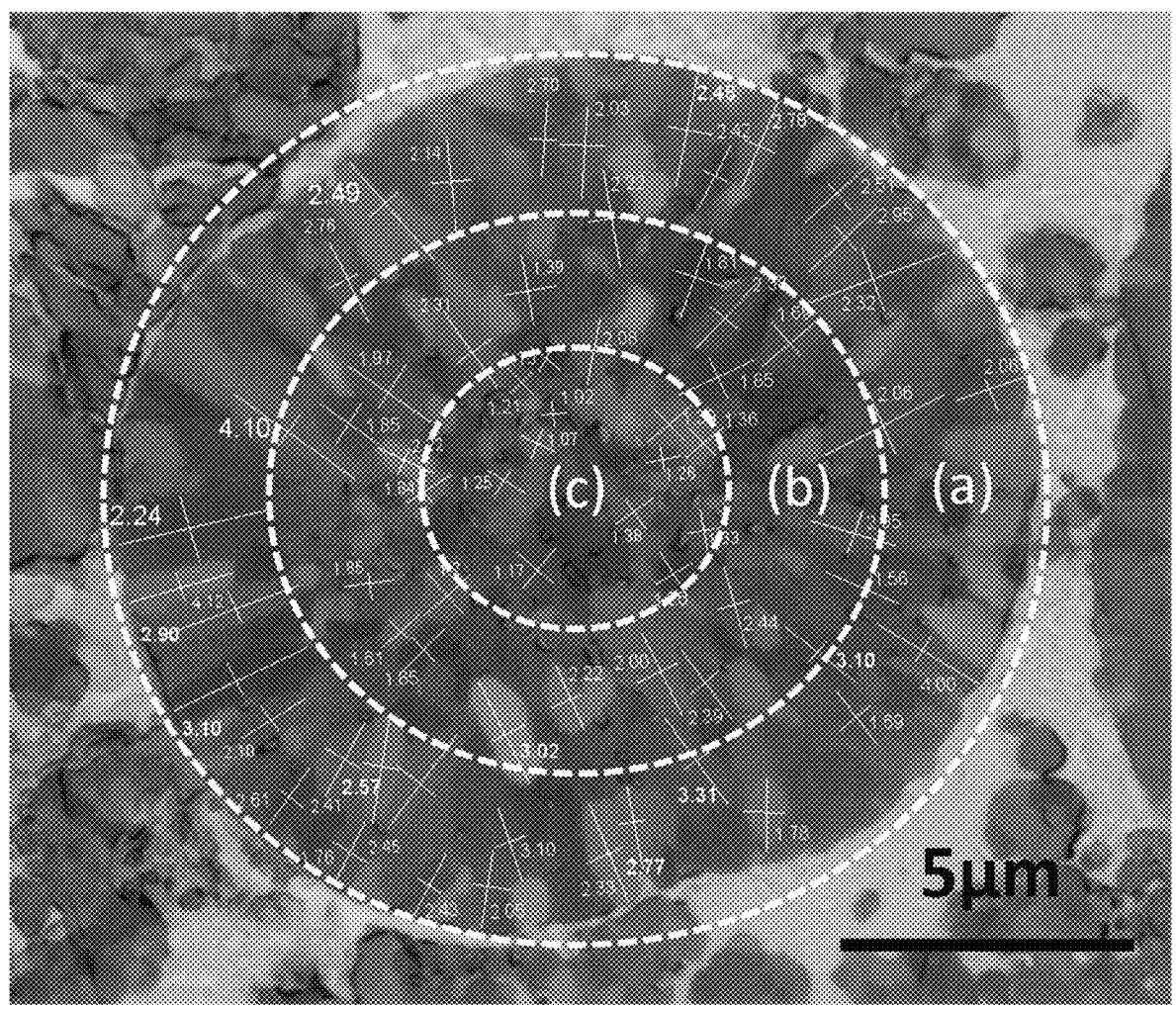
FIGS. 4 to 9 are cross-sectional SEM images of positive electrode active materials according to Examples 1 to 6 of the present invention, respectively.

The hydroxide precursor was mixed with a Li-containing raw material LiOH and an Al-containing raw material ($Al_2O_3$) using a mixer, and the temperature was raised by 1° C. per minute while maintaining an $O_2$ atmosphere in a calcination furnace, maintained at 350° C. for 4 hours, further raised by 2° C. per minute, and then maintained at a heat treatment temperature of 650° C. for 10 hours, followed by natural cooling of the resulting mixture. The positive electrode active material prepared in Example 1 was confirmed to have the compositional formula $Li_{1.010}Ni_{0.907}Co_{0.079}Al_{0.014}O_2$. The cross-sectional SEM image of the positive electrode active material is shown in FIG. 4.

Example 2

Figure 5:
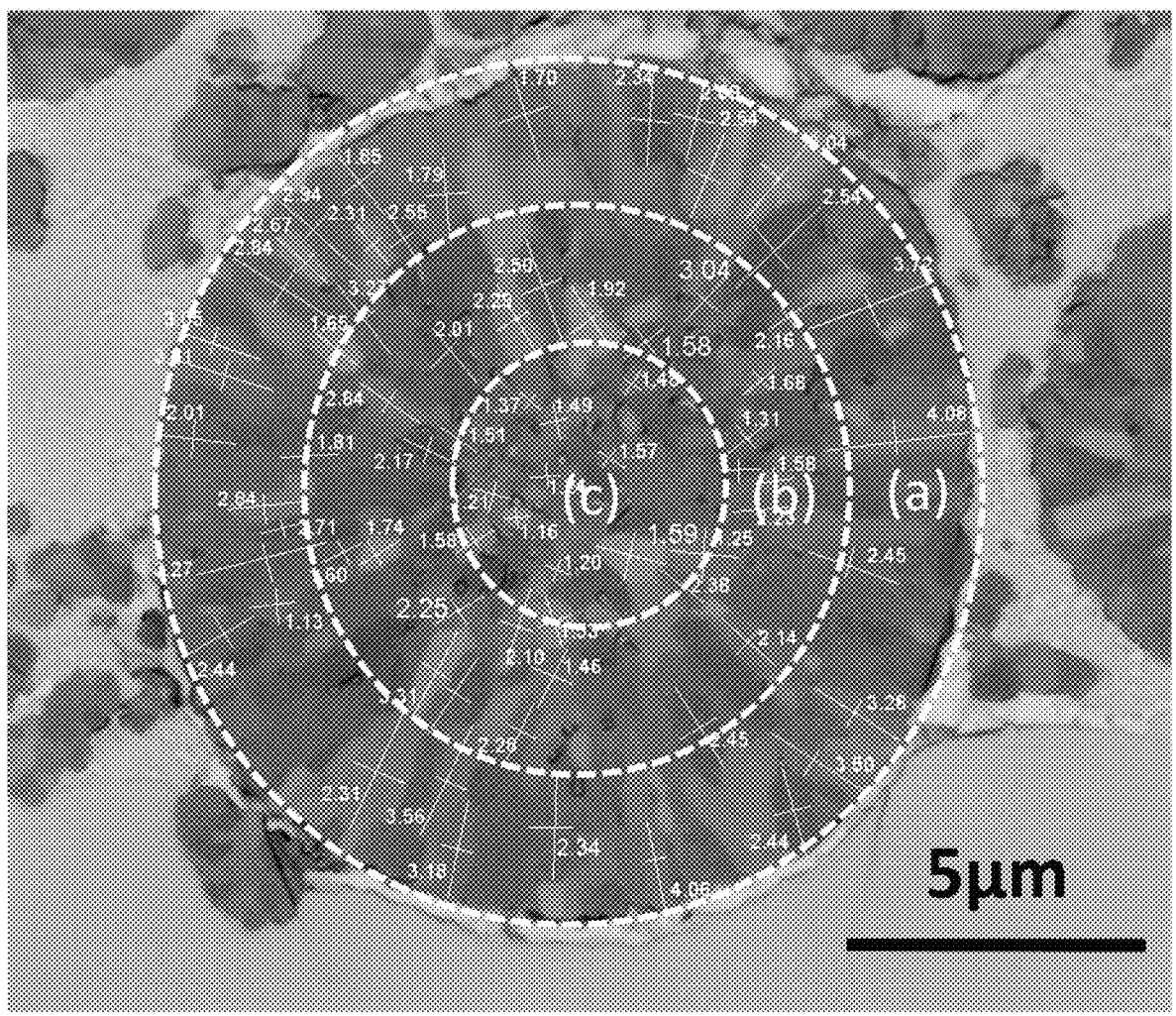

After the positive electrode active material obtained in Example 1 was mixed with a W-containing raw material ($WO_3$) using a mixer, the temperature was raised by 2° C. per minute while maintaining an $O_2$ atmosphere in the same calcination furnace used above, and maintained at a heat treatment temperature of 600° C. for 5 hours, followed by natural cooling of the resulting mixture. Subsequently, heat treatment and cooling were performed once under the same conditions as described above. The positive electrode active material prepared in Example 2 was confirmed to have the compositional formula $Li_{1.010}Ni_{0.903}Co_{0.078}Al_{0.014}W_{0.005}O_2$. The cross-sectional SEM image of the positive electrode active material is shown in FIG. 5.

Example 3

Figure 6:
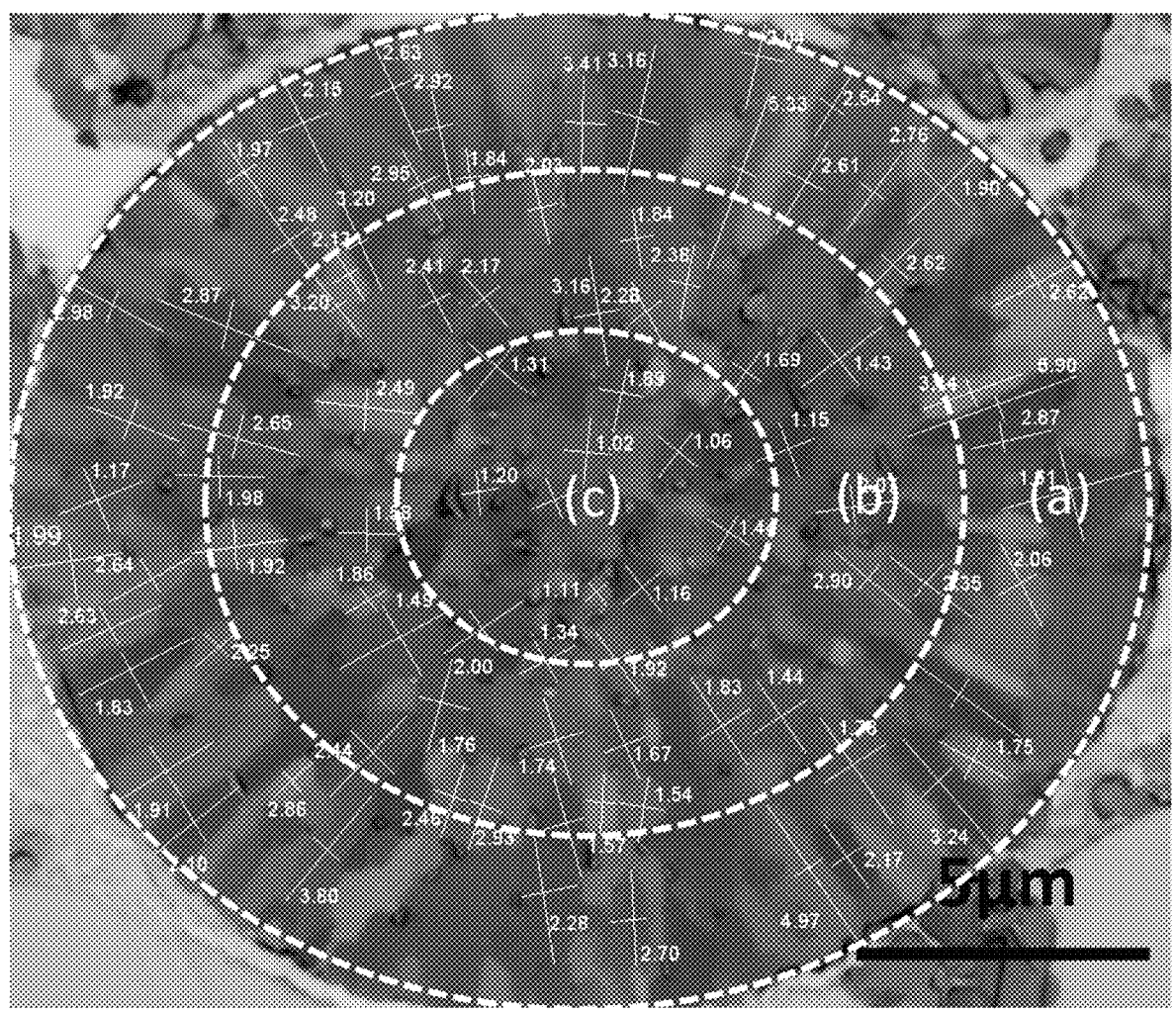

A positive electrode active material was prepared by the same method as described in Example 2, except that the positive electrode active material obtained in Example 3 was mixed with a cobalt-containing raw material (Co(OH)$_2$), instead of a W-containing raw material (WO$_3$), to have the compositional formula Li$_{1.010}$Ni$_{0.903}$Co$_{0.083}$Al$_{0.014}$O$_2$. The cross-sectional SEM image of the positive electrode active material is shown in FIG. 6.

Example 4

Figure 7:
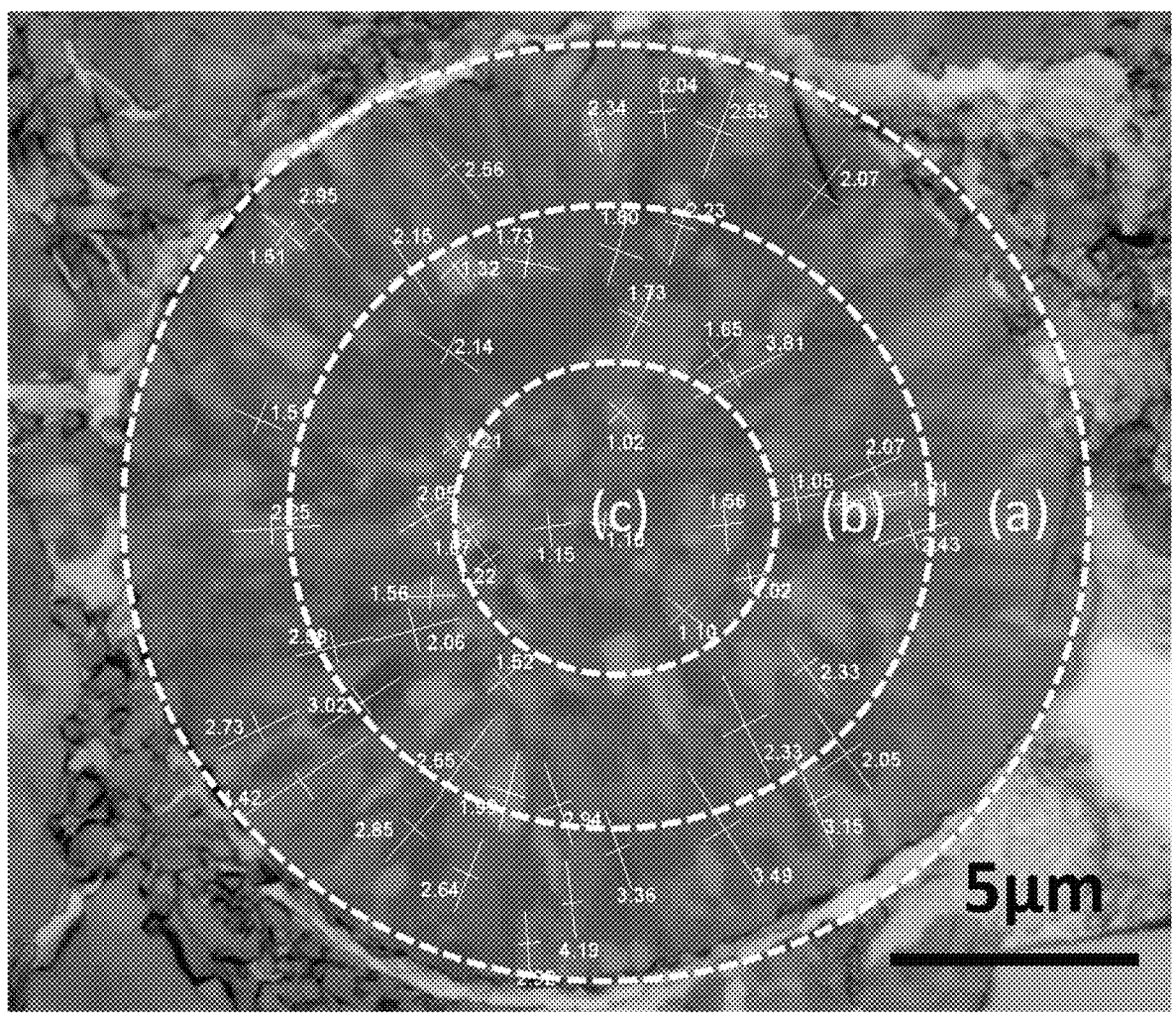

A positive electrode active material was prepared by the same method as described in Example 2, except that the positive electrode active material obtained in Example 4 was mixed with a cerium-containing raw material (CeO$_2$), instead of a W-containing raw material (WO$_3$), to have the compositional formula Li$_{1.010}$Ni$_{0.903}$Co$_{0.078}$Al$_{0.014}$Ce$_{0.005}$O$_2$. The cross-sectional SEM image of the positive electrode active material is shown in FIG. 7.

Example 5

Figure 8:
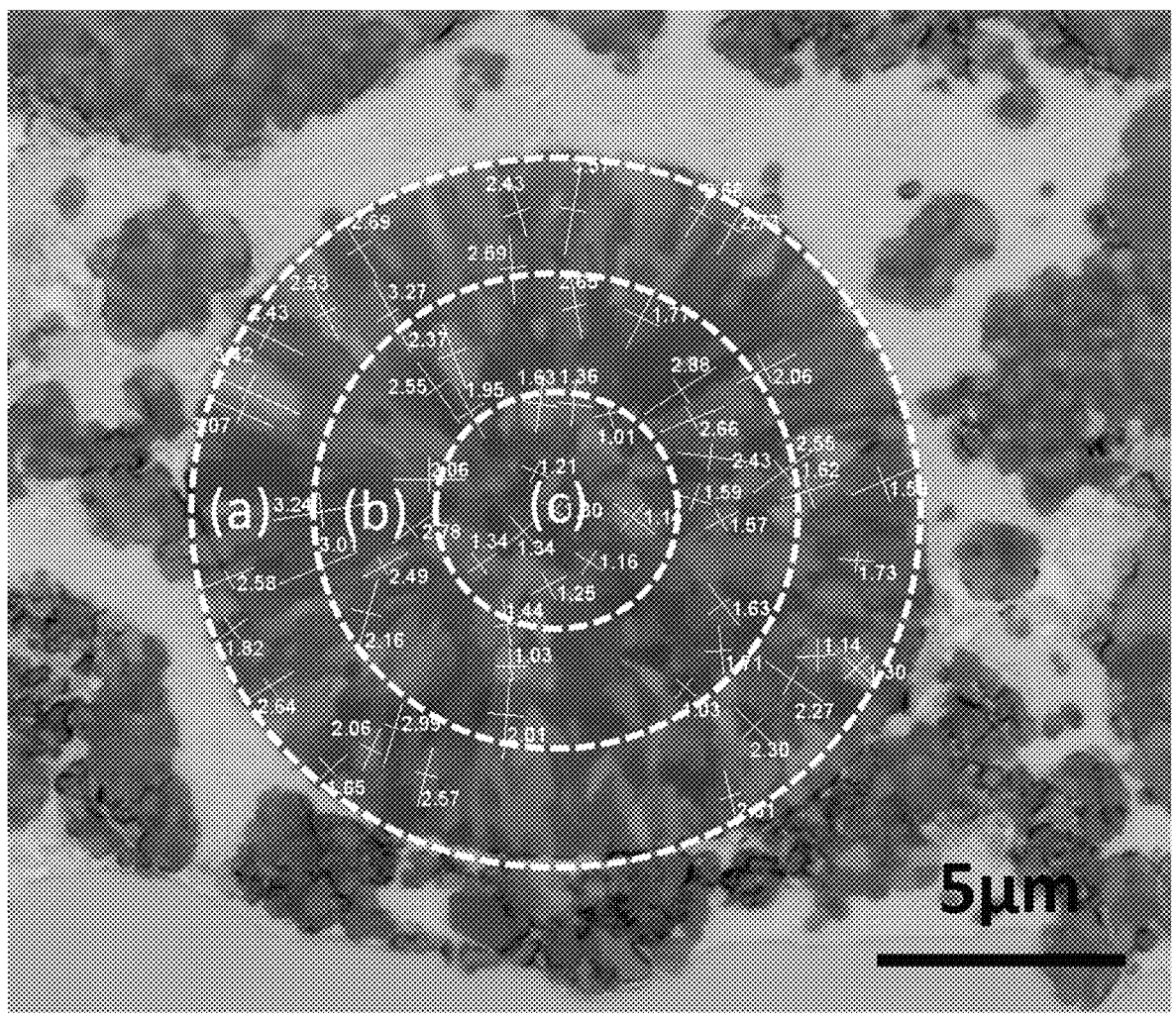

A positive electrode active material was prepared by the same method as described in Example 2, except that the positive electrode active material obtained in Example 5 was mixed with a niobium-containing raw material (Nb$_2$O$_5$), instead of a W-containing raw material (WO$_3$), to have the compositional formula Li$_{1.010}$Ni$_{0.903}$Co$_{0.078}$Al$_{0.014}$Nb$_{0.005}$O$_2$. The cross-sectional SEM image of the positive electrode active material is shown in FIG. 8.

Example 6

Figure 9:
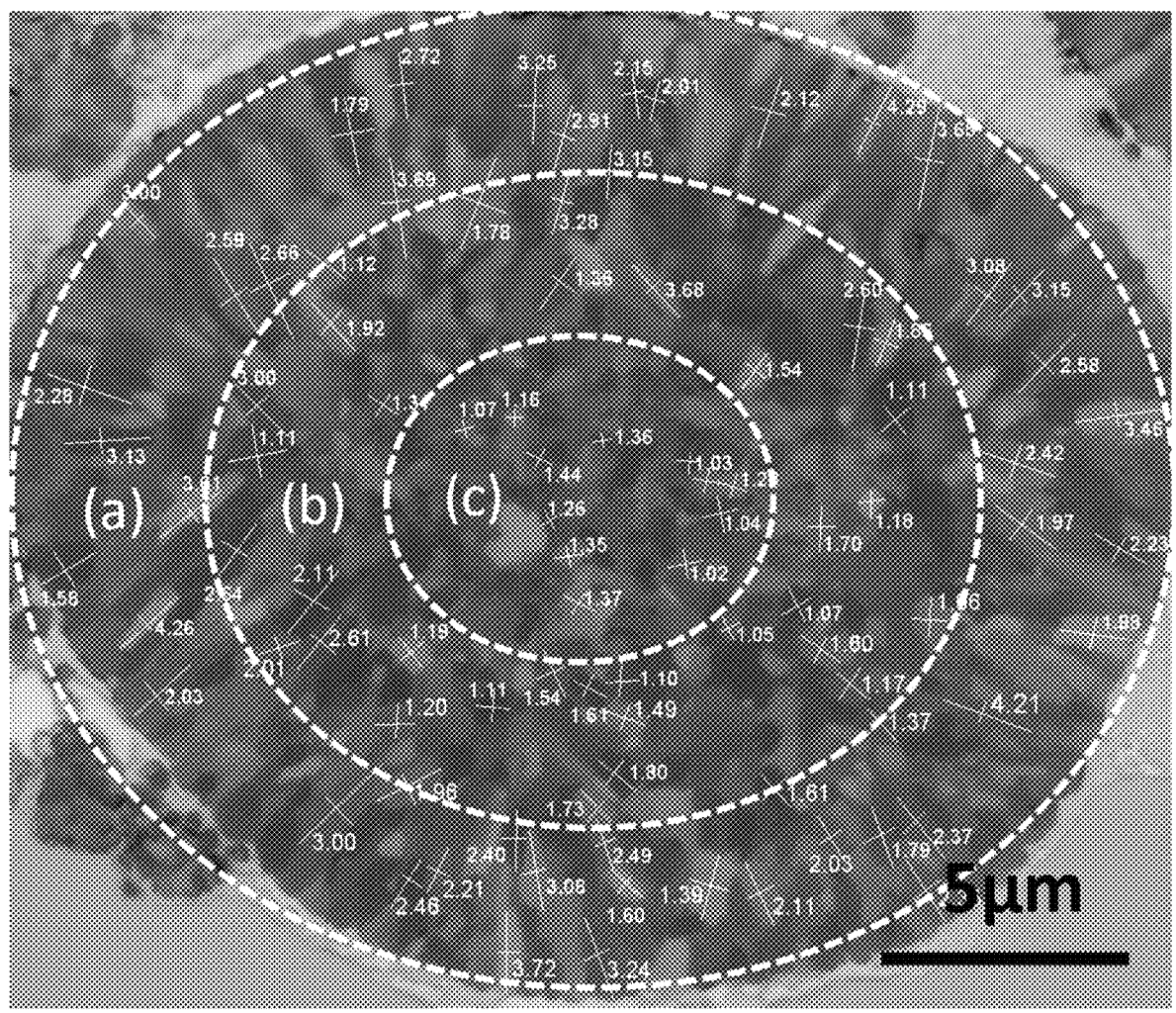

A positive electrode active material was prepared by the same method as described in Example 2, except that the positive electrode active material obtained in Example 6 was mixed with a boron-containing raw material (H$_3$BO$_3$), instead of a W-containing raw material (WO$_3$), to have the compositional formula Li$_{1.010}$Ni$_{0.903}$Co$_{0.078}$Al$_{0.014}$B$_{0.005}$O$_2$. The cross-sectional SEM image of the positive electrode active material is shown in FIG. 9.

Comparative Example 1

Figure 10:
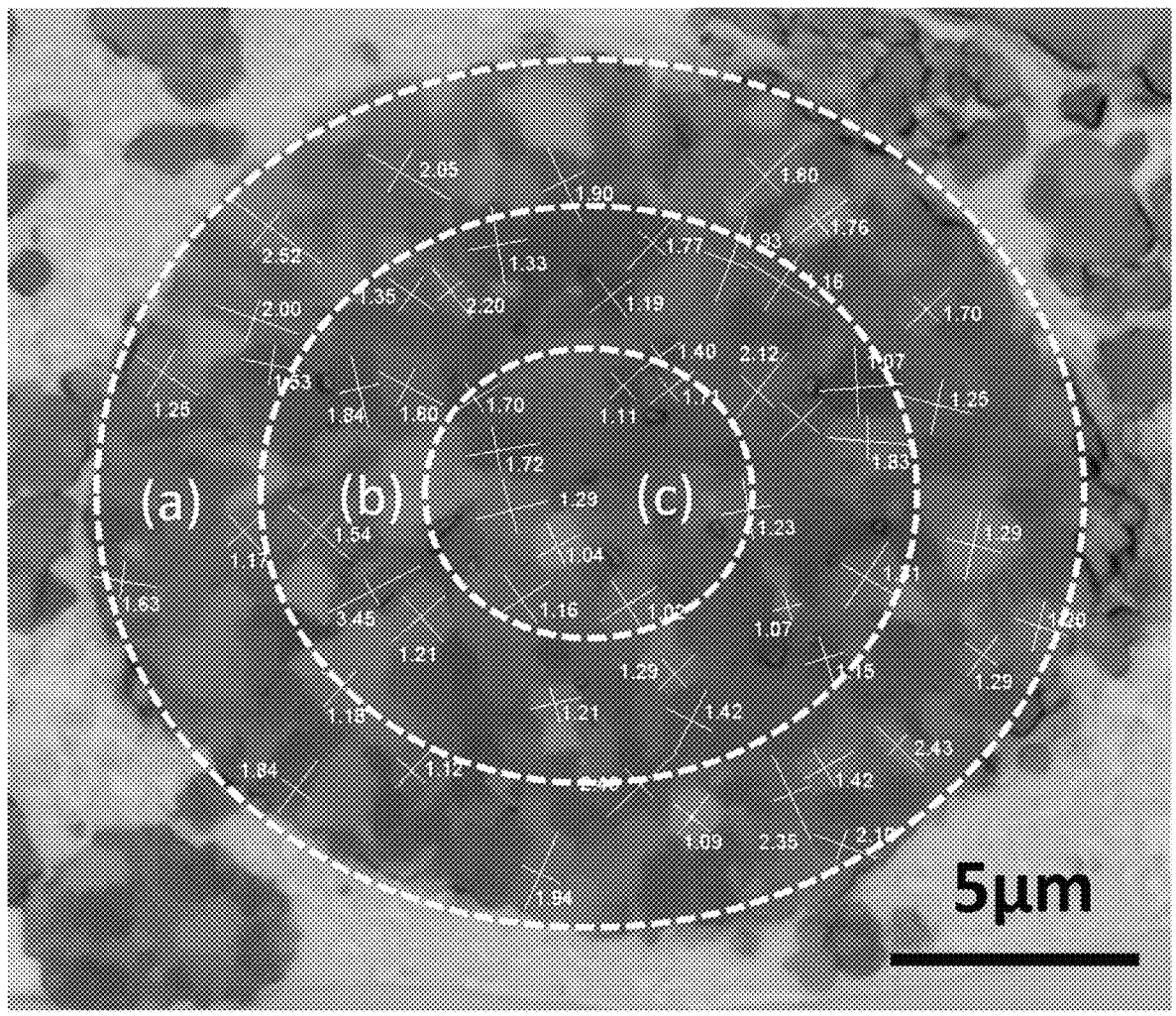
FIGS. 10 and 11 are cross-sectional SEM images of positive electrode active materials according to Comparative Examples 1 and 2, respectively.

A positive electrode active material was prepared by the same method as described in Example 1, except that a metal aqueous solution, a 30 wt % ammonia solution and a 20% sodium hydroxide aqueous solution were input into a reactor for 10 to 20 hours at 6.0 kg/hr, 0.4 kg/hr and 4 kg/hr, respectively. The cross-sectional SEM image of the positive electrode active material is shown in FIG. 10.

Comparative Example 2

Figure 11:
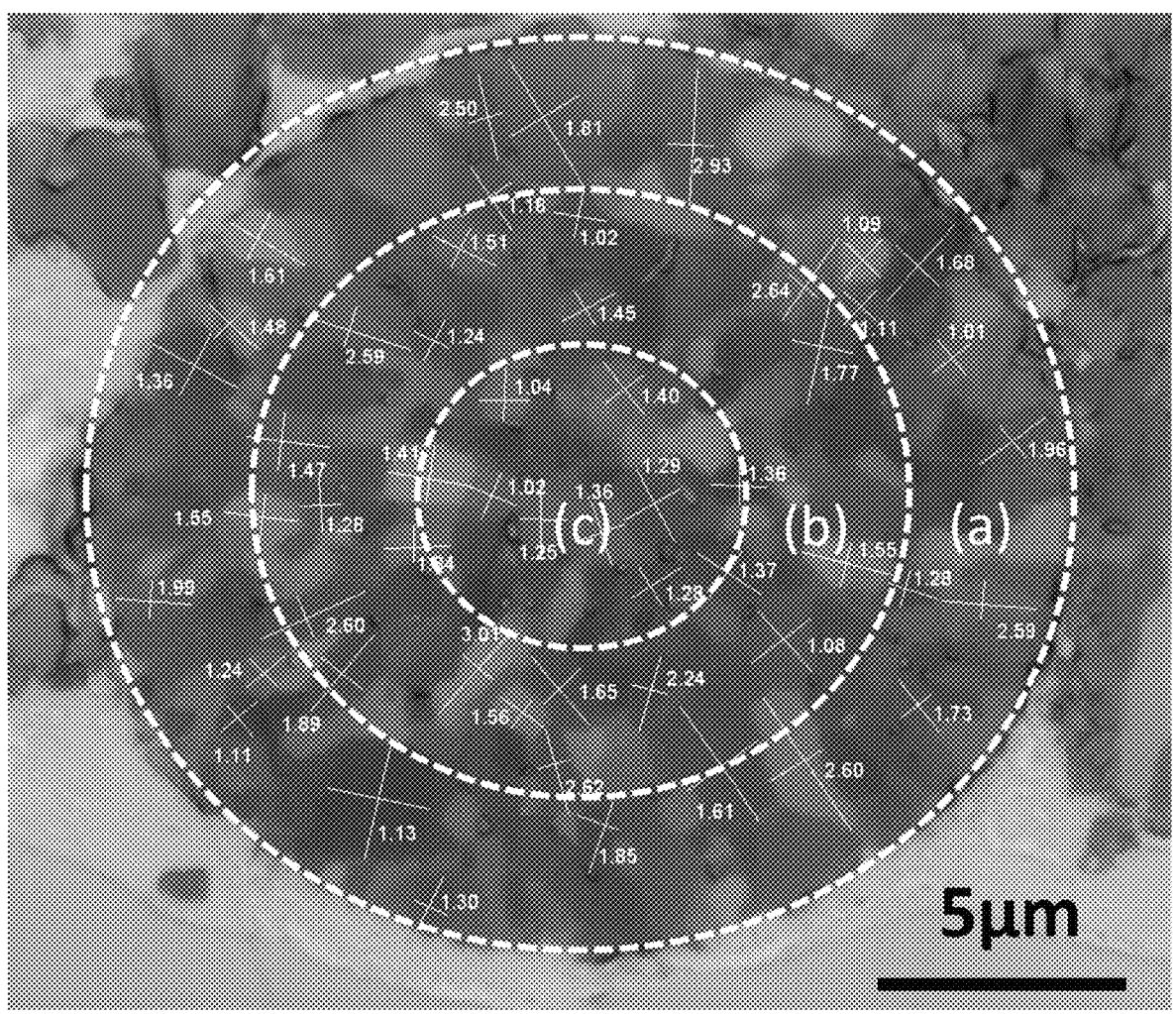

After the positive electrode active material obtained in Comparative Example 1 was mixed with a W-containing raw material (WO$_3$) using a mixer, the temperature was raised by 2° C. per minute while maintaining an O$_2$ atmosphere in the same calcination furnace as used in the preparation of the positive electrode active material obtained in Comparative Example 1, and maintained at a heat treatment temperature of 600° C. for 5 hours, followed by natural cooling of the resulting mixture. Subsequently, heat treatment and cooling were performed once again under the same conditions as described above. The positive electrode active material prepared in Comparative Example 2 was confirmed to have the compositional formula Li$_{1.010}$Ni$_{0.903}$Co$_{0.078}$Al$_{0.014}$W$_{0.005}$O$_2$. The cross-sectional SEM image of the positive electrode active material is shown in FIG. 11.

(2) SEM Analysis of Positive Electrode Active Materials

Each of the positive electrode active materials (secondary particles) according to the examples and the comparative examples was subjected to cross-section processing using a cross-section polisher (accelerating voltage: 5.0 kV, 4-hr milling), and then images were obtained by FIB-SEM (Ga-ion mode, accelerating voltage: 30.0 kV, probe current: 0.3 to 0.5 nA). Aspect ratios of primary particles identified from the cross-sectional SEM images were measured, and are shown in Table 1 and FIGS. 5 to 11.

TABLE 1

| Classification | $L_1$ | $L_2$ | $L_3$ | $X_1$ | $X_2$ | $X_3$ | $X_2/X_1$ |
|---|---|---|---|---|---|---|---|
| Example 1 | 2.62 | 2.03 | 1.25 | 1.29 | 1.62 | 2.10 | 0.79 |
| Example 2 | 2.66 | 2.08 | 1.38 | 1.28 | 1.51 | 1.93 | 0.85 |
| Example 3 | 2.71 | 2.04 | 1.35 | 1.33 | 1.51 | 2.01 | 0.88 |
| Example 4 | 2.72 | 2.05 | 1.16 | 1.33 | 1.77 | 2.34 | 0.75 |
| Example 5 | 2.42 | 2.07 | 1.29 | 1.17 | 1.60 | 1.88 | 0.73 |
| Example 6 | 2.62 | 1.89 | 1.21 | 1.39 | 1.56 | 2.17 | 0.89 |
| Comparative Example 1 | 1.68 | 1.6 | 1.33 | 1.05 | 1.20 | 1.26 | 0.87 |
| Comparative Example 2 | 1.65 | 1.78 | 1.23 | 0.93 | 1.45 | 1.34 | 0.64 |

In Table 1, the average aspect ratio ($L_1$) is an average value of aspect ratios measured from 35 to 50 primary particles present in a first region in which the distance from the center of a secondary particle is ⅔R to R, and the average aspect ratio ($L_2$) is an average value of aspect ratios measured from 20 to 30 primary particles present in a second region in which the distance from the center of a secondary particle is ⅓R to ⅔R, and the average aspect ratio ($L_3$) is an average value of aspect ratios measured from 9 to 15 primary particles present in a third region in which the distance from the center of a secondary particle is 0 to ⅓R. In addition, $X_1$ is $L_1/L_2$, $X_2$ is $L_2/L_3$, and $X_3$ is $L_1/L_3$.

(3) Measurement of Densities of Positive Electrode Active Materials

In the formation of a positive electrode for a lithium secondary battery using a positive electrode active material, a slurry containing a positive electrode active material was applied onto a positive electrode current collector, and then subjected to drying and rolling (pressing) processes. Here, the performance of the positive electrode active material may be reduced due to particle collapse of the positive electrode active material applied on the positive electrode current collector, which occurred in rolling with a high pressure.

In this experimental example, to confirm the change in strength of the positive electrode active material according to the composition of an aggregate of multiple secondary particles included in the positive electrode active material, each of the positive electrode active materials prepared in the examples and the comparative examples was prepared, and then d(10), d(50) and d(90) variations of the particle size distribution were measured before pressing, after 2.5-ton pressing, after 4.5-ton pressing and after 6-ton pressing.

The measurement results for the d(10), d(50) and d(90) variations of the particle size distribution after pressing according to each pressure condition are shown in Tables 2 to 4 below.

TABLE 2

| Pressing pressure | d(10) variation | |
|---|---|---|
| | Example 2 | Comparative Example 1 |
| 2.5 tons | 1.5% | 17% |
| 4.5 tons | 2.7% | 31% |
| 6.0 tons | 6% | 38% |

TABLE 3

| Pressing pressure | d(50) variation | |
|---|---|---|
| | Example 2 | Comparative Example 1 |
| 2.5 tons | 1% | 17% |
| 4.5 tons | 1.5% | 31% |
| 6.0 tons | 2.5% | 38% |

TABLE 4

| Pressing pressure | d(90) variation | |
|---|---|---|
| | Example 2 | Comparative Example 1 |
| 2.5 tons | 3% | 17% |
| 4.5 tons | 6% | 31% |
| 6.0 tons | 10% | 38% |

Referring to Tables 2 to 4, it can be confirmed that the d(10), d(50) and d(90) variations of the particle size distribution before/after pressing of the secondary particles included in the positive electrode active material according to Example 2 are significantly smaller than those of the positive electrode active material according to Comparative Example 1.

Experimental Example 2

(1) Manufacture of Lithium Secondary Battery

A positive electrode slurry was prepared by dispersing 94 wt % each of the positive electrode active materials prepared according to the examples and the comparative examples, 3 wt % of carbon black and 3 wt % of a PVDF binder in 30 g of N-methyl-2-pyrrolidone (NMP). A positive electrode was formed by coating and drying the positive electrode slurry on a positive electrode current collector, which is an aluminum (Al) thin film, having a thickness of 15 μm, and performing roll pressing. A loading level of the positive electrode was 10 mg/cm², and an electrode density was 3.2 g/cm³.

A lithium metal was used as a counter electrode for the positive electrode, and an electrolyte solution was prepared by adding 1.15M $LiPF_6$ to a solvent in which ethylene carbonate (EC), ethyl methyl carbonate (EMC) and dimethyl carbonate (DMC) were mixed in a volume ratio of 2:4:4.

A lithium secondary battery (coin cell) was manufactured by forming a battery assembly by interposing a separator formed of a porous polyethylene (PE) film between the positive electrode and the negative electrode, and injecting the electrolyte solution thereinto.

(2) Evaluation of Capacity Characteristics of Lithium Secondary Battery

A charge/discharge test was performed on the lithium secondary battery manufactured by the above-described method by applying a discharge rate of 0.5C to 4.0C in a voltage range of 3.0V to 4.25V at 25 C using an electrochemical analyzer (Toyo, Toscat-3100), and an initial charge capacity, an initial discharge capacity, an initial reversible efficiency and a rate characteristic were measured. The measured battery capacity and charge/discharge efficiency are shown in Table 5 below.

TABLE 5

| Classification | Charge capacity (mAh/g) | Discharge capacity (mAh/g) | Charge/ discharge efficiency (%) | 4.0 C/ 0.2 C rate characteristic (%) |
|---|---|---|---|---|
| Example 1 | 233.6 | 212.9 | 91.2 | 76.6 |
| Example 2 | 231.9 | 211.5 | 91.2 | 79.2 |
| Example 3 | 231.4 | 209.2 | 90.4 | 78.9 |
| Example 4 | 232.4 | 209.6 | 90.2 | 78.6 |
| Example 5 | 232.0 | 207.9 | 89.6 | 78.7 |
| Example 6 | 232.6 | 208.9 | 89.8 | 79.0 |
| Comparative Example 1 | 233.8 | 211.4 | 90.4 | 72.0 |
| Comparative Example 2 | 233.4 | 212.4 | 91.0 | 73.2 |

Referring to the results shown in Table 5, the initial capacity and the charge/discharge efficiency of the lithium secondary batteries including positive electrodes using the positive electrode active materials according to the examples and the comparative examples are similar to each other, but according to the result of a charge/discharge test in which a discharge rate of 0.5C to 4.0C was applied, it can be confirmed that the lithium secondary batteries including positive electrodes using the positive electrode active materials according to the examples had a higher rate characteristic, compared with the comparative examples.

(3) Evaluation of Stability of Lithium Secondary Battery

The lithium secondary batteries (coin cells) manufactured above were subjected to 100 cycles of charging/discharging in a driving voltage range from 3.0 to 4.25 V with a constant current (CC) of 1C at 25° C. Accordingly, after 100 cycles of charging/discharging at room temperature, cycle capacity retention, which is a ratio of discharge capacity at the 100$^{th}$ cycle to the initial capacity, was measured.

In addition, resistances before/after the lifetime of each lithium secondary battery were measured to confirm a resistance variation.

The measurement results are shown in Table 6 below.

TABLE 6

| Classification | Capacity retention (%) | Resistance before lifetime (Ω) | Resistance after lifetime (Ω) |
|---|---|---|---|
| Example 1 | 85.1 | 4.2 | 35.6 |
| Example 2 | 88.9 | 4.0 | 19.9 |
| Example 3 | 90.1 | 4.7 | 29.6 |

TABLE 6-continued

| Classification | Capacity retention (%) | Resistance before lifetime (Ω) | Resistance after lifetime (Ω) |
|---|---|---|---|
| Example 4 | 90.2 | 6.0 | 24.2 |
| Example 5 | 90.1 | 5.1 | 20.7 |
| Example 6 | 88.8 | 4.2 | 18.4 |
| Comparative Example 1 | 75.8 | 4.1 | 44.0 |
| Comparative Example 2 | 77.3 | 3.9 | 40.9 |

Referring to the results shown in Table 6, it can be confirmed that the lithium secondary batteries using the positive electrode active materials prepared according to the examples have excellent capacity retention and a small variation in the resistance before and after high-temperature storage, compared with the lithium secondary batteries using the positive electrode active materials prepared according to the comparative examples.

Figure 12:
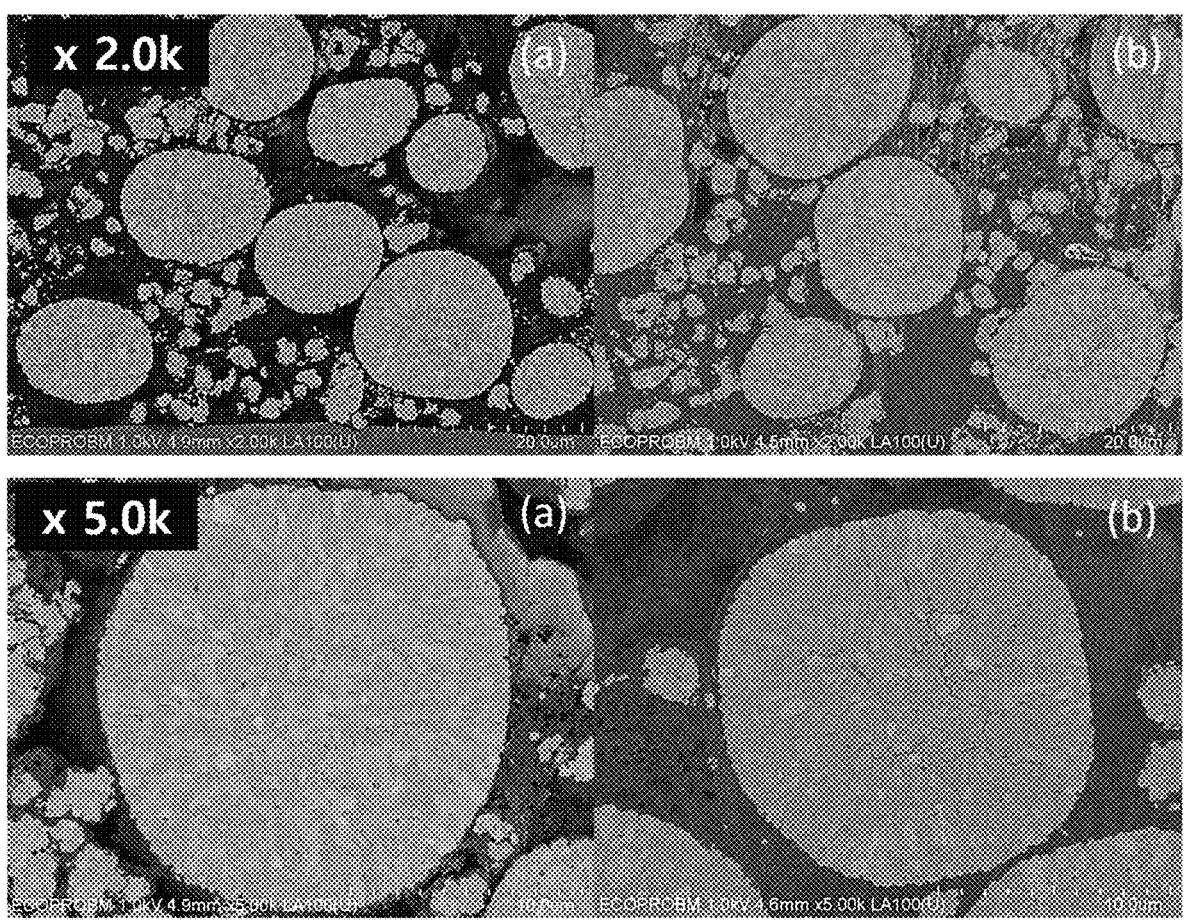
FIG. 12 is a set of cross-sectional SEM images before (a)/after (b) the lifetime of a positive electrode active material according to Example 1 of the present invention.
Figure 13:
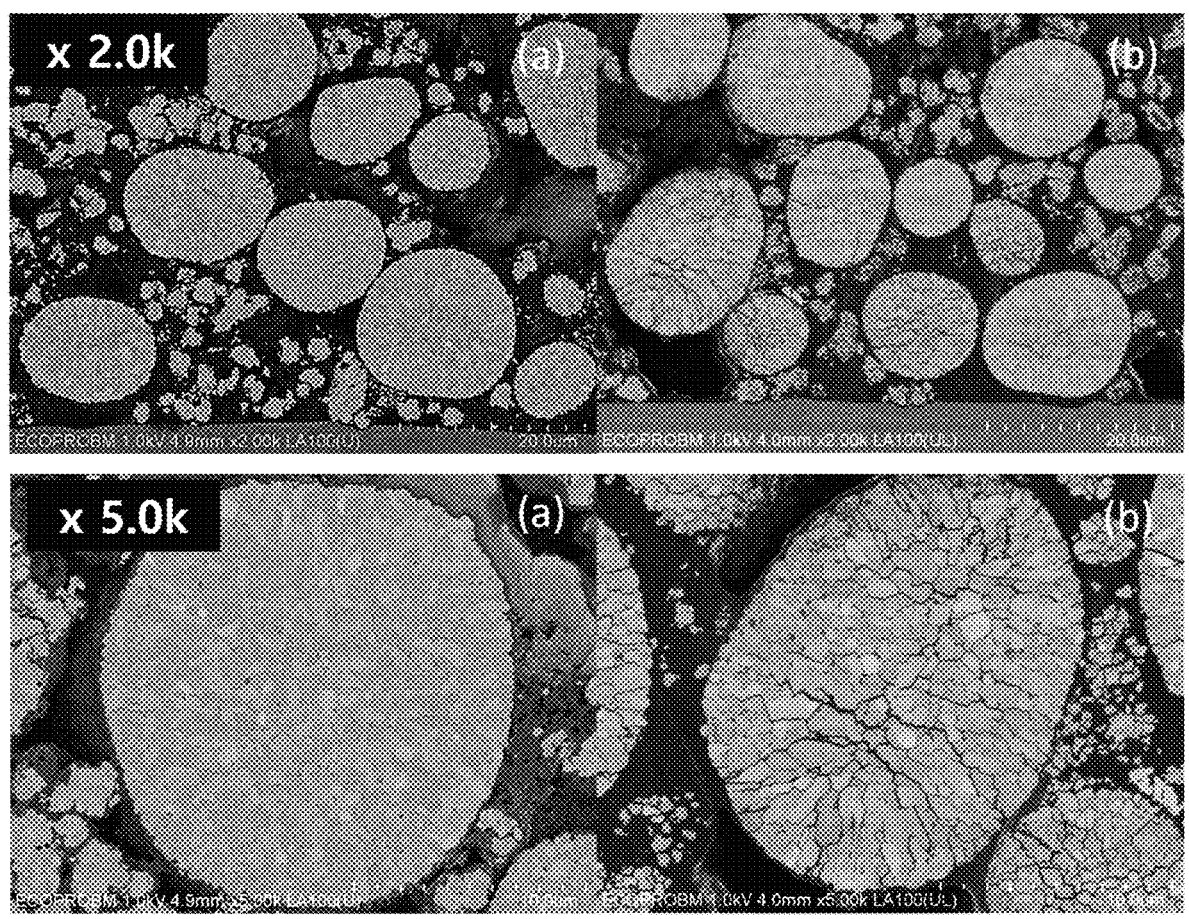
FIG. 13 is a set of cross-sectional SEM images before (a)/after (b) the lifetime of a positive electrode active material according to Comparative Example 1.

In addition, referring to FIG. 12 showing a set of cross-sectional SEM images before (a)/after (b) the lifetime of a positive electrode active material according to Example 1 of the present invention and FIG. 13 showing a set of cross-sectional SEM images before (a)/after (b) the lifetime of a positive electrode active material according to Comparative Example 1, it can be confirmed that the positive electrode active material according to Example 1 has less cracks after its lifetime, compared with the positive electrode active material according to Comparative Example 1. This is because, as the aspect ratio gradient of the primary particles included in the positive electrode active material according to Example 1 exhibits directionality in which it is increased in a specific range, a partial strain caused by asymmetric volume expansion of the positive electrode active material can be effectively reduced, particularly, in charging/discharging of a lithium secondary battery. Through the decrease in strain, cracks may be reduced after the lifetime of the positive electrode active material, which may contribute to the improvement in the lifetime and stability of the lithium secondary battery.

Positive electrode active materials according to various embodiments of the present invention include primary particles enabling lithium intercalation and deintercalation and secondary particles formed by agglomerating the primary particles. As the primary particles included in the secondary particles exhibit an aspect ratio gradient increasing from the center of the secondary particle to the surface thereof, the density of the primary particles in the secondary particles can be improved. Therefore, as a result, a high energy density of the positive electrode active material can be expected.

In addition, as the aspect ratio gradient of the primary particles included in the secondary particle exhibits directionality in which it is increased in a specific range, a partial strain caused by asymmetric volume expansion of the positive electrode active material can be effectively reduced, particularly, in charging/discharging of a lithium secondary battery. Through the decrease in strain, cracks can be reduced after the lifetime of the positive electrode active material. Accordingly, the lifetime and stability of the lithium secondary battery can be improved.

Specific effects of the present invention as well as the above-described effects were described while details for implementing the present invention were described above.

Above, while the examples of the present invention have been described, it will be understood by those of ordinary skill in the art that the present invention may be changed and modified in various ways by addition, alteration, or deletion of components without departing from the spirit of the present invention defined in the appended claims.

What is claimed is:

1. A positive electrode active material comprising:
a primary particle enabling lithium intercalation and deintercalation and a secondary particle in which a plurality of primary particles are agglomerated,
wherein the primary particle has an aspect ratio continuously increasing from the center of the secondary particle to the surface thereof,
wherein the aspect ratio of the primary particle is a length/width ratio of a major axis to a minor axis of the primary particle,
wherein the primary particle and the secondary particle satisfy the following Formula 1 and Formula 2:

$1.15 \le X_1 \le 1.75$, [Formula 1]

$1.35 \le X_2 \le 1.95$, [Formula 2]

wherein
when the distance from the center of the secondary particle to the surface thereof is R,
$L_1$ is an average aspect ratio of the primary particles present in a first region in which the distance from the center of the secondary particle is (⅔)R to R,
$L_2$ is an average aspect ratio of the primary particles present in a second region in which the distance from the center of the secondary particle is (⅓)R to (⅔)R,
$L_3$ is an average aspect ratio of the primary particles present in a third region in which the distance from the center of the secondary particle is 0 to (⅓)R, and
$X_1$ is a ratio ($L_1/L_2$) of $L_1$ to $L_2$,
$X_2$ is a ratio ($L_2/L_3$) of $L_2$ to $L_3$,
wherein each primary particle of the primary particles present in the first region, the second region and the third region is represented by Chemical Formula 1 below:

$Li_wNi_{1-(x+y+z)}Co_xM1_yM2_zO_2$ [Chemical Formula 1]

wherein
M1 is at least one selected from Mn and Al,
M2 is at least one selected from Mn, B, Ba, Ce, Hf, Ta, Cr, F, Mg, Al, Cr, V, Ti, Fe, Zr, Zn, Si, Y, Nb, Ga, Sn, Mo, W, P, Sr, Ge, Nd, Gd and Cu,
M1 and M2 are elements different from each other, and
$0.5 \le w \le 1.5$, $0.01 \le x \le 0.50$, $0.01 \le y \le 0.20$, $0.001 \le z \le 0.20$.

2. The positive electrode active material of claim 1, wherein the primary particle and the secondary particle satisfy the following Formula 3:

$X_1/X_2 \ge 0.70$ [Formula 3].

3. The positive electrode active material of claim 1, wherein the primary particle and the secondary particle satisfy the following Formula 4:

$X_3 \ge 1.70$ [Formula 4]

wherein $X_3$ is a ratio ($L_1/L_3$) of $L_1$ to $L_3$.

4. The positive electrode active material of claim 1, wherein the primary particle has a rod shape radiated from the center of the secondary particle to the surface thereof, and the direction of the major axis of the primary particle represents directionality towards the center of the secondary particle.

5. The positive electrode active material of claim 1, wherein an angle between a lithium ion diffusion pathway in the primary particle and the major axis direction of the primary particle is ±40°.

6. The positive electrode active material of claim 5, wherein the lithium ion diffusion pathway is formed to have an angle of approximately ±40° based on the direction connecting the center of the secondary particle to the surface thereof.

7. The positive electrode active material of claim 1, further comprising:
a coating layer which covers at least a part of the interface between the primary particles and a region selected from the surface of the secondary particle,
wherein the coating layer comprises at least one oxide represented by Chemical Formula 2 below:

$$Li_aM3_bO_c \qquad \text{[Chemical Formula 2]}$$

wherein M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, and $2 \leq c \leq 13$.

8. A lithium secondary battery which uses a positive electrode comprising the positive electrode active material according claim 1.

* * * * *